(12) United States Patent
Zhang et al.

(10) Patent No.: US 9,995,399 B2
(45) Date of Patent: Jun. 12, 2018

(54) SELF-SEALING BUTTERFLY VALVE

(71) Applicant: SHANDONG LEDE MACHINERY CO., LTD, Weicheng Weifang, Shandong (CN)

(72) Inventors: Tonghu Zhang, Shandong (CN); Yuanshui Li, Shandong (CN); Xinguo Chen, Shandong (CN); Bo Chen, Shandong (CN)

(73) Assignee: SHANDONG LEDE MACHINERY CO., LTD., Shandong (CN)

( * ) Notice: Subject to any disclaimer, the term of this patent is extended or adjusted under 35 U.S.C. 154(b) by 0 days. days.

(21) Appl. No.: 14/912,707

(22) PCT Filed: Aug. 12, 2014

(86) PCT No.: PCT/CN2014/084158
§ 371 (c)(1),
(2) Date: Feb. 18, 2016

(87) PCT Pub. No.: WO2015/024468
PCT Pub. Date: Feb. 26, 2015

(65) Prior Publication Data
US 2016/0201808 A1 Jul. 14, 2016

(30) Foreign Application Priority Data
Aug. 20, 2013 (CN) .......................... 2013 1 0363791

(51) Int. Cl.
*F16K 1/22* (2006.01)
*F16K 1/226* (2006.01)

(52) U.S. Cl.
CPC ............ *F16K 1/2261* (2013.01); *F16K 1/222* (2013.01)

(58) Field of Classification Search
CPC ........ F16K 1/222; F16K 1/226; F16K 1/2261; F16K 1/12268
(Continued)

(56) References Cited

U.S. PATENT DOCUMENTS 3,186,682 A * 6/1965 Pierson ................. F16K 1/2268
251/306
3,666,233 A 5/1972 Scaramucci
(Continued)

FOREIGN PATENT DOCUMENTS

AU 407295 B2 3/1965
CN 2201531 Y 6/1995
(Continued)

OTHER PUBLICATIONS

English translation of International Search Report for PCT/CN2014/084158 dated Nov. 18, 2014.
(Continued)

*Primary Examiner* — Marina Tietjen
(74) *Attorney, Agent, or Firm* — Pearne & Gordon LLP

(57) ABSTRACT

A self-sealing butterfly valve includes a valve body, wherein a fluid passage is provided in the valve body, a valve plate of which an outer surface is covered with an elastic sealing layer is provided within the fluid passage, an upper portion of the valve plate is dynamically connected with a driving shaft which is rotatably connected to the valve body, a lower portion of the valve plate is rotatably connected with a supporting shaft which is connected to the valve body, the elastic sealing layer—at outer edges of two end faces of the valve plate axially protrudes outwardly, forming two ring lips attached to an inner wall of the fluid passage, and the ring lips are gradually thicker from outside to inside, so that inner ring faces of the ring lips are inclined faces.

6 Claims, 12 Drawing Sheets

(58) Field of Classification Search
USPC .......................................................... 251/306
See application file for complete search history.

(56) References Cited

U.S. PATENT DOCUMENTS

| | | | |
|---|---|---|---|
| 3,727,883 A | | 4/1973 | Conners et al. |
| 3,991,974 A | | 11/1976 | Bonafous |
| 4,266,754 A | | 5/1981 | Ninomiya et al. |
| 5,884,898 A | * | 3/1999 | Miyairi .................. F01N 1/166 251/305 |
| 8,800,965 B2 | | 8/2014 | Stefani et al. |
| 9,303,771 B2 | | 4/2016 | Stefani et al. |
| 2009/0184476 A1 | | 7/2009 | Stefani et al. |
| 2010/0065763 A1 | | 3/2010 | Suetome et al. |
| 2014/0374639 A1 | | 12/2014 | Stefani et al. |

FOREIGN PATENT DOCUMENTS

| | | |
|---|---|---|
| CN | 201582409 U | 9/2010 |
| CN | 202091528 U | 12/2011 |
| CN | 202901322 U | 4/2013 |
| CN | 103438228 A | 12/2013 |
| CN | 203413138 U | 1/2014 |
| DE | 1 425 647 A1 | 3/1969 |
| DE | 19958045 A1 | 6/2001 |
| EP | 1 975 479 A2 | 10/2008 |
| FR | 1339202 | 10/1963 |
| JP | 4825707 Y | 7/1973 |
| JP | 6012762 U | 1/1985 |
| JP | S60101367 A | 6/1985 |
| JP | 09303575 A | 11/1997 |
| JP | 2000-234522 A | 8/2000 |
| JP | 2011501065 A | 1/2011 |
| WO | 2010110723 A1 | 9/2010 |

OTHER PUBLICATIONS

CN201313063791.X Search Report dated Aug. 20, 2013.
Office action for JP 2016-530342 dated Dec. 1, 2016.
Extended European Search Report issued in Patent Application No. EP 14 83 8495 dated Mar. 8, 2017.
Korean Office Action issued in Patent Application No. KR 10-2016-7002455 dated Apr. 17, 2017.

* cited by examiner

SELF-SEALING BUTTERFLY VALVE

CROSS-REFERENCE TO RELATED APPLICATIONS

This application is a National Stage of International Application No. PCT/CN2014/084158, filed on Aug. 12, 2014, which claims priority to Chinese Patent Application No. 201310363791.X, filed on Aug. 20, 2013, both of which are hereby incorporated by reference in their entireties.

TECHNICAL FIELD

The present disclosure relates to a self-sealing butterfly valve.

BACKGROUND

An existing center-line butterfly valve includes a valve body, wherein a fluid passage is provided in the valve body, a valve plate of which an outer surface is covered with an elastic sealing layer is provided within the fluid passage, an upper portion of the valve plate is dynamically connected with a driving shaft which is rotatably connected to the valve body, and a lower portion of the valve plate is rotatably connected with a supporting shaft which is connected to the valve body. The driving shaft drives the valve plate to rotate centered with an axis of the driving shaft and the supporting shaft, to achieve opening and closing. The elastic sealing layer covered on an outer periphery of the valve plate is extruded and elastically deformed by the valve plate and an inner wall of the fluid passage, to achieve sealing upon being closed. The center-line butterfly valve of the structure above mainly has the following drawbacks: the first drawback is that it is highly demanding on rigidity of the valve body and a valve shaft; if the rigidity of the valve body is insufficient, deformation may occur under action of fluid pressure, causing lax contact between the valve body and the valve plate and consequently leakage; if the rigidity of the valve shaft is insufficient, the valve body will be displaced axially along the fluid passage under the action of fluid pressure, thereby causing valve leakage; in order to enhance the rigidity of the valve body and the valve shaft, an amount of material in use for the valve body and the valve shaft has to increase, which causes a large weight for the valve body and the valve shaft, thereby incurring a high manufacturing cost. The second drawback is that a larger pressure on the elastic sealing layer not only causes the valve to have large opening and closing torques, but also aggravates wear of the elastic sealing layer, which shortens a service life of the valve and is not suitable for a pipeline system that is opened and closed frequently; besides, a self-weight of the valve plate also exacerbates wear and makes the opening and closing more difficult.

SUMMARY

A first technical problem to be solved by the present disclosure is, for addressing the above first drawback, providing a self-sealing butterfly valve that is less demanding on rigidity of a valve body and a valve shaft, may effectively decrease weights of the valve body and the valve shaft, reduces a manufacturing cost, and has a better sealing effect.

A second technical problem to be solved by the present disclosure is, for addressing the above second drawback, providing a self-sealing butterfly valve that has small opening and closing torques, may further alleviate wear of an elastic sealing layer, prolongs a service lift of the valve, and is suitable for a pipeline system which is opened and closed frequently.

In order to solve the first technical problem above, a first technical solution is provided by the present disclosure as follows: a self-sealing butterfly valve includes a valve body, wherein a fluid passage is provided in the valve body, a valve plate of which an outer surface is covered with an elastic sealing layer is provided within the fluid passage, an upper portion of the valve plate is dynamically connected with a driving shaft which is rotatably connected to the valve body, a lower portion of the valve plate is rotatably connected with a supporting shaft which is connected to the valve body, and wherein the elastic sealing layer at outer edges of two end faces of the valve plate axially protrudes outwardly, forming two ring lips attached to an inner wall of the fluid passage, and the ring lips are gradually thicker from outside to inside, so that inner ring faces of the ring lips are inclined faces.

In order to solve the second technical problem above, the following improvements are made based on the first technical solution: an upper inflated portion for connection with the driving shaft is provided at the upper portion of the valve plate, a lower inflated portion for connection with the supporting shaft is provided at the lower portion of the valve plate, a lower surface of the upper inflated portion and an upper surface of the lower inflated portion are oppositely arranged, and an area of the lower surface of the upper inflated portion is greater than an area of the upper surface of the lower inflated portion.

In order to solve the first technical problem above, a second technical solution is provided in the present disclosure as follows: a self-sealing butterfly valve includes a valve body, wherein a fluid passage is provided in the valve body, a valve plate is provided within the fluid passage, an upper portion of the valve plate is dynamically connected with a driving shaft which is rotatably connected to the valve body, a lower portion of the valve plate is rotatably connected with a supporting shaft which is connected to the valve body, and wherein the valve plate is sleeved with an elastic sealing ring which is capable of enveloping an outer periphery face of the valve plate and outer edges of two end faces of the valve plate, outer edges of two end faces of the elastic sealing ring axially protrude outwardly, forming two ring lips attached to an inner wall of the fluid passage, and the ring lips are gradually thicker from outside to inside, so that inner ring faces of the ring lips are inclined faces.

In order to solve the second technical problem, the following improvements are made based on the second technical solution: an upper inflated portion for connection with the driving shaft is provided at the upper portion of the valve plate, a lower inflated portion for connection with the supporting shaft is provided at the lower portion of the valve plate, a lower surface of the upper inflated portion and an upper surface of the lower inflated portion are oppositely arranged, and an area of the lower surface of the upper inflated portion is greater than an area of the upper surface of the lower inflated portion.

For a reliable connection between the elastic sealing ring and the valve plate, the elastic sealing ring includes a loop for covering an outer peripheral face of the valve plate, the loop has a driving shaft mounting hole and a supporting shaft mounting hole at two opposite sides, two barriers are provided at intervals on an inner wall face of the loop, the two barriers and the loop form, in concert, a mounting annular groove for sleeving the valve plate, outer side faces of two barriers form the two end faces of the elastic sealing ring, the ring lips are arranged at outer edges of the barriers, and convex ribs are circularly provided on the two end faces of the elastic sealing ring.

For a more reliable connection between the elastic sealing ring and the valve plate so as to prevent local castoff or entire castoff of the elastic sealing ring when the valve plate rotates, the two end faces of the valve plate are respectively connected with a stop ring, inner end faces of the two stop rings are respectively attached with pressure on the two end faces of the elastic sealing ring, outer peripheral faces of two stop rings are all inclined faces which may abut against the inner ring faces, inner end faces of the stop rings are provided with locating annular grooves, and the convex ribs may be inserted into the locating annular grooves.

For a convenient connection between the stop ring and the valve plate and a convenient adjustment of an extrusion degree of the stop rings against the elastic sealing ring, the stop rings are circularly arranged with a plurality of bolt penetration holes and a plurality of threaded holes, the stop rings are connected to the valve plate by being inserted bolts into the bolt penetration holes, and screws abutting against the valve plate are threaded inside the threaded holes.

For facilitating the processing forming and process simplification of the stop rings, the stop ring is a split structure including a plurality of unit sheets, wherein each unit sheet is at least provided with two bolt penetration holes and one threaded hole.

In order not to dampen the self-sealing effect of the ring lips and to prevent the stop rings from affecting the attaching effect with the fluid passage inner wall under a fluid pressure, a thickness of the stop ring is less than an axial length of the ring lip.

For the availability of materials, the elastic sealing layer is a rubber layer or a polytetrafluoroethylene layer, and the elastic sealing ring is a rubber sealing ring or a polytetrafluoroethylene sealing layer.

For the self-sealing butterfly valve of the above structure, the valve plate of which the outer surface is covered with the elastic sealing layer or the outer edge is sleeved with the elastic sealing ring is slightly interference-fitted with the fluid passage, which may satisfy low-pressure sealing of the fluid; with gradual increase of the fluid pressure within the fluid passage, the fluid presses the ring lips; because the inner ring faces of the ring lips are inclined faces, radial component forces are generated after the ring lips are pressed by the fluid, such that the ring lips are tightly attached to the inner wall of the fluid passage, thereby forming self-sealing, which boosts a good sealing effect for the present disclosure. Besides, because the self-sealing may be achieved by the ring lips under the action of the fluid pressure, even if the valve body and the valve shaft are slightly deformed, the ring lips may also be tightly attached to the inner wall of the fluid passage under the action of the fluid pressure, thereby, the rigidity requirement may be appropriately lowered under the condition of satisfying the rigidity of the valve body and valve shaft, i.e., appropriately reducing the wall thickness of the valve body and the diameter of the valve shaft, so as to achieve the objective of saving materials and decreasing the manufacture costs.

For the improved self-sealing butterfly valve, because the lower surface of the upper inflated portion and the upper surface of the lower inflated portion are oppositely arranged, and the area of the lower surface of the upper inflated portion is greater than the area of the upper surface of the lower inflated portion, the pressure imposed by the fluid on the lower surface of the upper inflated portion is greater than the pressure imposed by the fluid on the upper surface of the lower inflated portion, i.e., a pressure difference exists, the pressure difference may effectively counteract the self-weight of the valve plate, such that the valve plate achieves an effect of floating towards the driving shaft direction, therefore, the wear of the elastic sealing layer caused by self-weight of the valve plate may be reduced, and the service life of the valve may be prolonged, further, the opening and closing torques may be reduced, which makes the opening and closing of the valve flexible.

In view of the above, the present disclosure has the following advantages: 1. Self-sealing may be achieved and the sealing effect is great; 2. It is less demanding on the rigidity of the valve body and the valve shaft, such that the wall thickness of the valve body and the diameter of the valve shaft may be reduced, which saves materials and reduces the production costs; 3. The opening and closing torques are small, such that the opening and closing are flexible with minor wear, thereby prolonging the service life of the valve; 4. It may be used for a pipeline system that is opened and closed frequently.

BRIEF DESCRIPTION OF DRAWINGS

Hereinafter, specific embodiments of the present disclosure will be further detailed with reference to the accompanying drawings.

DESCRIPTION OF EMBODIMENTS

Figure 1:
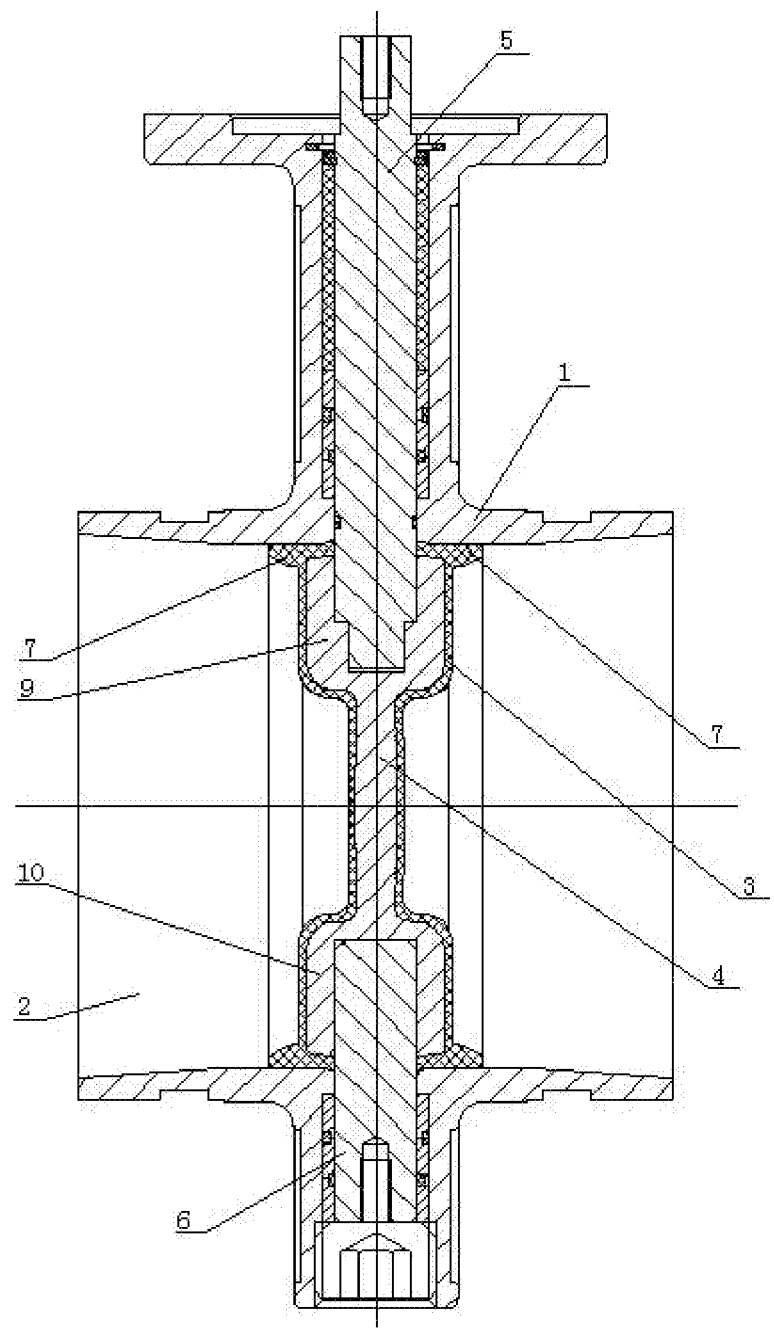
FIG. 1 shows a schematic diagram of a first self-sealing butterfly valve.
Figure 2:
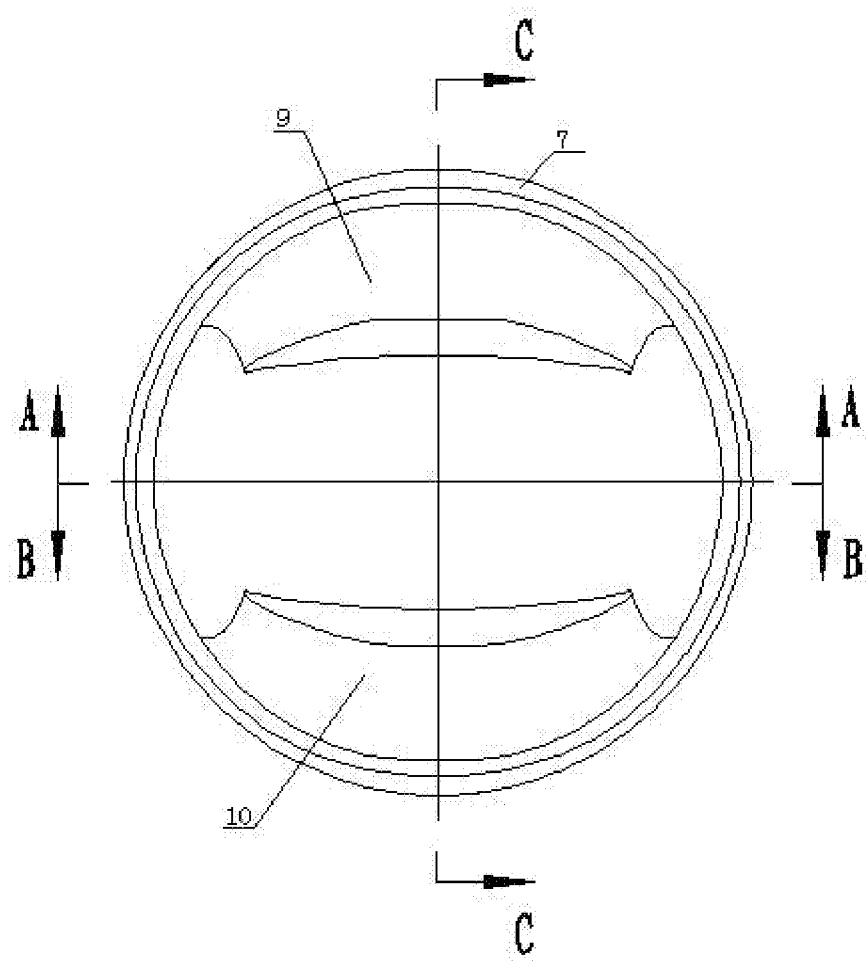
FIG. 2 shows a structural diagram of a of a valve plate.
Figure 3:
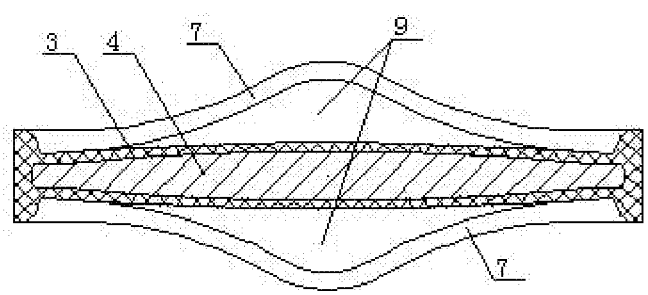
FIG. 3 shows a sectional view along an A-A line in FIG. 2.
Figure 4:
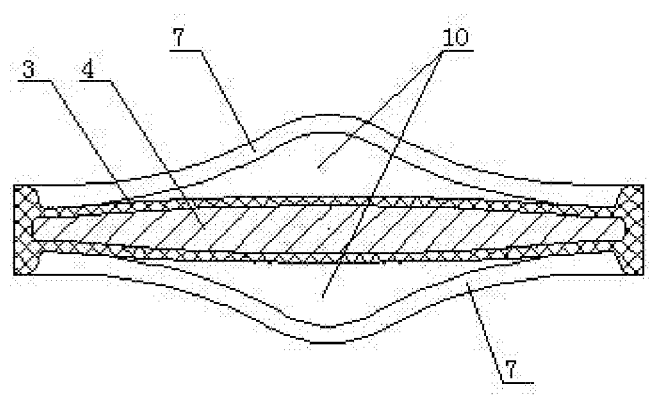
FIG. 4 shows a sectional view along a B-B line in FIG. 2.
Figure 5:
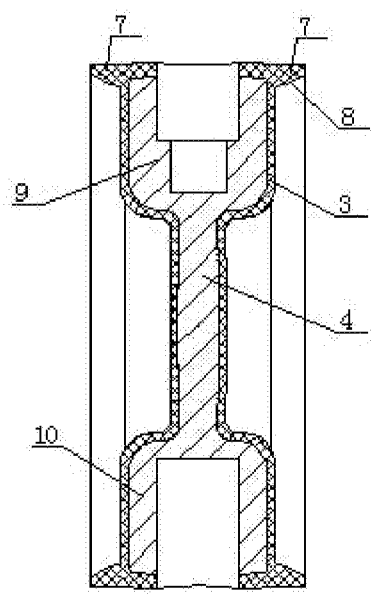
FIG. 5 shows a sectional view along a C-C line in FIG. 2.

With reference to FIG. 1, a self-sealing butterfly of a first structure according to the present disclosure includes a valve body, wherein a fluid passage 2 is provided in the valve body, a valve plate 4 of which an outer surface is covered with an elastic sealing layer 3 is provided within the fluid passage 2, the elastic sealing layer 3 is a rubber layer or a polytetrafluoroethylene layer. An upper portion of the valve plate 4 is dynamically connected with a driving shaft 5 which is rotatably connected to the valve body 1, a lower portion of the valve plate 4 is rotatably connected with a supporting shaft 6 which is connected to the valve body.

Rotation of the driving shaft 5 may drive rotation of the valve plate 4 so as to realize opening and closing of the valve. The driving shaft 5 and the supporting shaft 6 are assembled with the valve body 1 using a sealing approach. The sealing approach is a common knowledge. For example, the driving shaft 5 and the supporting shaft 6 may be sealedly fitted with the valve body 1 by sleeving the draft shaft 5 and the supporting shaft 6 with a sealing ring.

With reference to FIGS. 1-5, the elastic sealing layer 3 at outer edges of two end faces of the valve plate 4 axially protrudes outwardly, thereby forming two ring lips 7 attached to an inner wall of the fluid passage 2; and the ring lips 7 are gradually thicker from outside to inside, such that inner ring faces 8 of the ring lips 7 are inclined faces. An upper inflated portion 9 for connection with the driving shaft 5 is provided at an upper portion of the valve plate 4, a lower inflated portion 10 for connection with the supporting shaft 6 is provided at a lower portion of the valve plate 4, a lower surface of the upper inflated portion 9 and an upper surface of the lower inflated portion 10 are oppositely arranged, and the area of a lower surface of the upper inflated portion 9 is greater than an area of the upper surface of the lower inflated portion 10.

For the above self-sealing butterfly valve, the outer surface of its valve plate is completely covered by the elastic sealing layer. Such a structure is suitable for a small-sized center-line butterfly valve, due to the small size of its valve plate, it is easily completely covered by the elastic sealing layer; however, for a large-sized center-line butterfly valve, due to the relative large size of its valve plate, it is hard to use the elastic sealing layer to completely cover the valve plate. In other words, the above self-sealing butterfly valve of the first structure is hardly made into a large-sized center-line butterfly valve.

Figure 6:
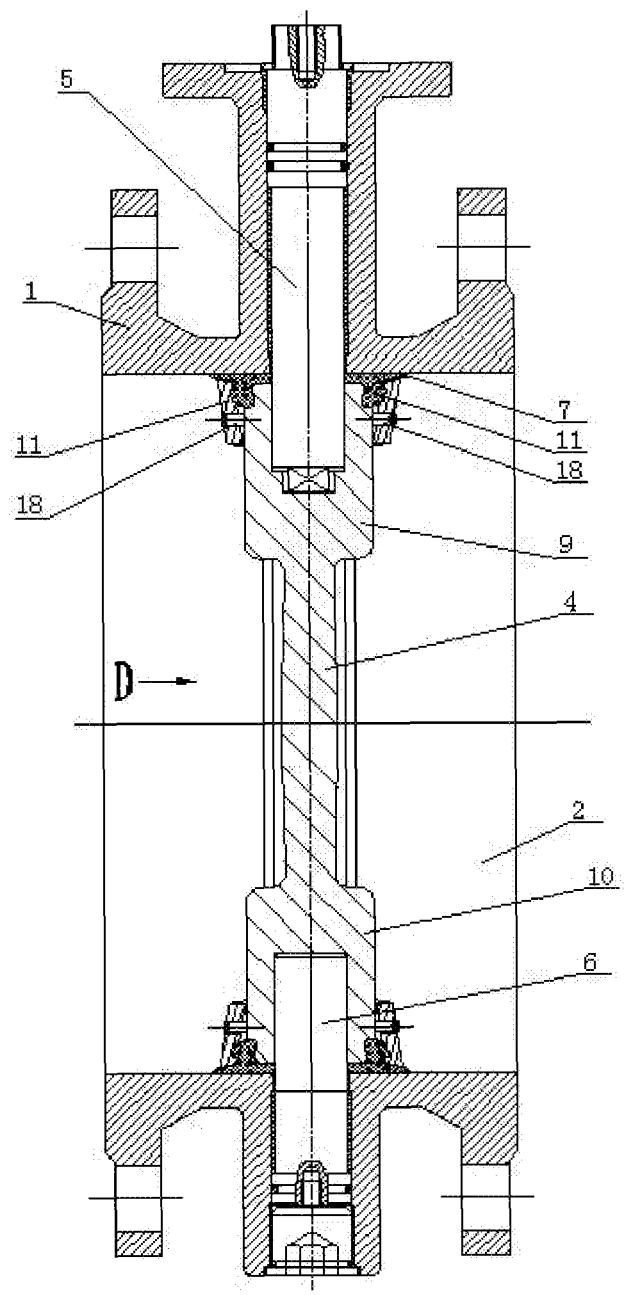
FIG. 6 shows a structural diagram of a second self-sealing butterfly valve.

Based on the sealing principle of the self-sealing butterfly valve of the first structure, a self-sealing butterfly valve of a second structure is provided so as to be suitable for manufacturing a large-sized self-sealing butterfly valve. With reference to FIG. 6, the self-sealing butterfly valve of the second structure includes a valve body 1, wherein a fluid passage 2 is provided in the valve body, a valve plate 4 is provided within the fluid passage 2, an upper portion of the valve plate 4 is dynamically connected with a driving shaft 5 which is rotatably connected to the valve body 1, a lower portion of the valve plate 4 is rotatably connected with a supporting shaft 6 which is connected to the valve body. Rotation of the driving shaft 5 may drive rotation of the valve plate 4 so as to realize opening and closing of the valve. The driving shaft 5 and the supporting shaft 6 are assembled with the valve body 1 using a sealing approach. The sealing approach is a common knowledge. For example, the driving shaft 5 and the supporting shaft 6 may be sealedly fitted with the valve body 1 by sleeving the draft shaft 5 and the supporting shaft 6 with a sealing ring. The valve plate 4 is sleeved with an elastic sealing ring 11 which is capable of enveloping an outer periphery face of the valve plate 4 and outer edges of two end faces of the valve plate 4, the two end faces of the valve plate 4 are respectively connected with a stop ring 12 by bolts, inner end faces of the two stop rings 12 are respectively attached with pressure on the two end faces of the elastic sealing ring 12. Outer edges of two end faces of the elastic sealing ring 11 axially protrude outwardly, thereby forming two ring lips 7 attached to an inner wall of the fluid passage 2; and the ring lips 7 are gradually thicker from outside to inside, such that inner ring faces 8 of the ring lips 7 are an inclined faces.

With reference to FIGS. 6, 11, 12, and 13, the elastic sealing ring 11 includes a loop 11-1 for covering the outer peripheral face of the valve plate 4, the loop 11-1 has a driving shaft mounting hole 11-4 for the driving shaft 5 to penetrate and a supporting shaft mounting hole 11-5 for the supporting shaft to penetrate at two opposite sides, two barriers 11-2 are provided at intervals on an inner wall face of the loop 11-1, the two barriers 11-2 and the loop 11-1 form, in concert, a mounting annular groove 11-3, the elastic sealing ring 11 is sleeved on the outer edge of the valve plate 4 via the mount annular groove 11-3, outer side faces of two barriers form the two end faces of the elastic sealing ring 11, outer edge portions of the outer side faces of the barriers 11-2 axially protrude outwardly to form the ring lips 7, and convex ribs 14 are circularly provided on the two end faces of the elastic sealing ring 11, i.e., on the outer side faces of two barriers 11-2.

With reference to FIGS. 6, 14, 15, and 16, the stop ring 12 is an annular disc. A locating annular groove 13 is provided on an inner end face of the annular disc, an outer peripheral face of the disc is an inclined face, the disc is circularly arranged with a plurality of bolt penetration holes 15 and a plurality of threaded holes 17, the bolt penetration holes 15 and the threaded holes 17 are alternately provided, i.e., a threaded hole 17 is provided between two adjacent bolt penetration holes 15. For the convenience of molding and for simplifying a manufacturing procedure, the stop ring 12 may be set as a split structure, i.e., the stop ring consists of a plurality of unit sheets, wherein each unit sheet is at least provided with two bolt penetration holes 15 and one threaded hole 17.

Figure 7:
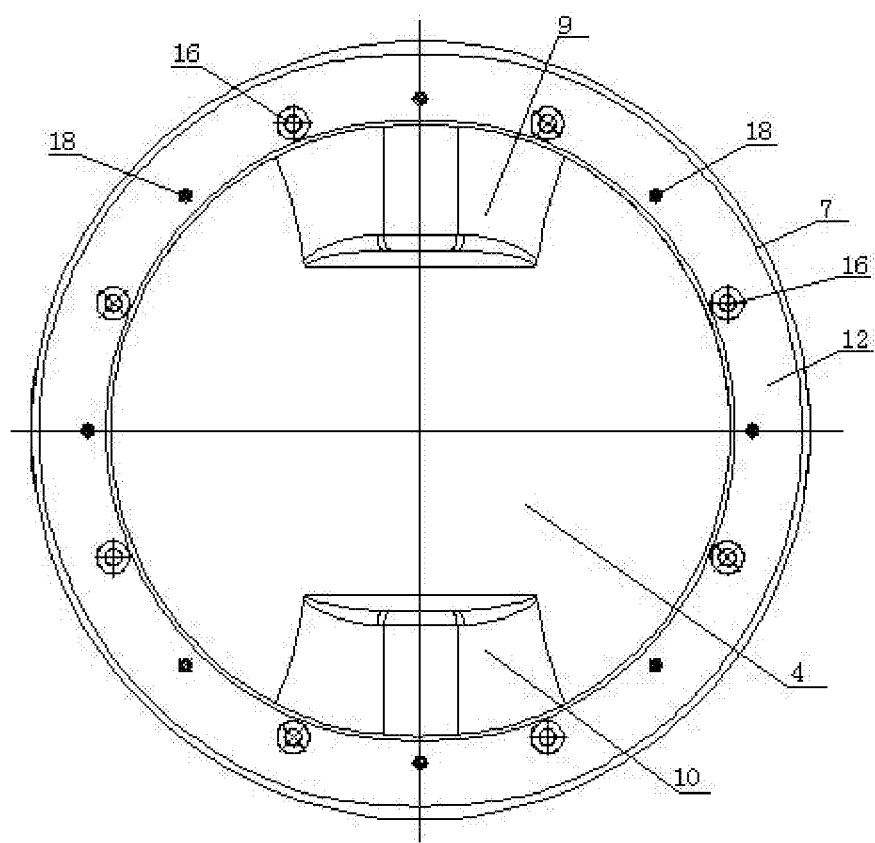
FIG. 7 shows a D-direction view of FIG. 6.

With reference to FIG. 6 and FIG. 7, after the elastic sealing ring 11 is sleeved on the valve plate 4, the two stop rings 12 are respectively threaded on the two end faces of the valve plate 4 by being inserted bolts 16 into the bolt penetration hole 15, the convex ribs 14 are inserted into the annular groove 13, cooperation between the convex ribs 14 and the annular groove 13 may better fix the elastic sealing ring 11 onto the valve plate 4. An inner end face of a stop ring 12 is attached with pressure on an end face of the elastic sealing ring 11, its outer peripheral face leans on an inner annular face 8 of a ring lip 7, an inner end face of the other stop ring 12 is attached with pressure on the other end face of the elastic sealing ring 11, its outer peripheral face leaning on an inner ring face 8 of the other ring lip 7. Within the threaded hole 17 is threaded a screw 18 abutting against the valve plate 4. By regulating the tightness of the bolt 16 and the screw 18, the extrusion degree of the barrier 12 against the elastic sealing ring 11 may be changed such that the elastic sealing ring is appropriately radially deformed, so as to obtain a desired appropriate interference amount when the elastic sealing ring 11 is assembled with the fluid passage 2. In order to prevent the stop ring 12 from interfering with the elastic deformation of the ring lip 7 under the fluid pressure, which may affect the fitting between the ring lip 7 and the inner wall of the fluid passage 2 and consequently causes a poor self-sealing effect, the thickness of the stop ring 12 is less than an axial length of the ring lip 7.

Figure 8:
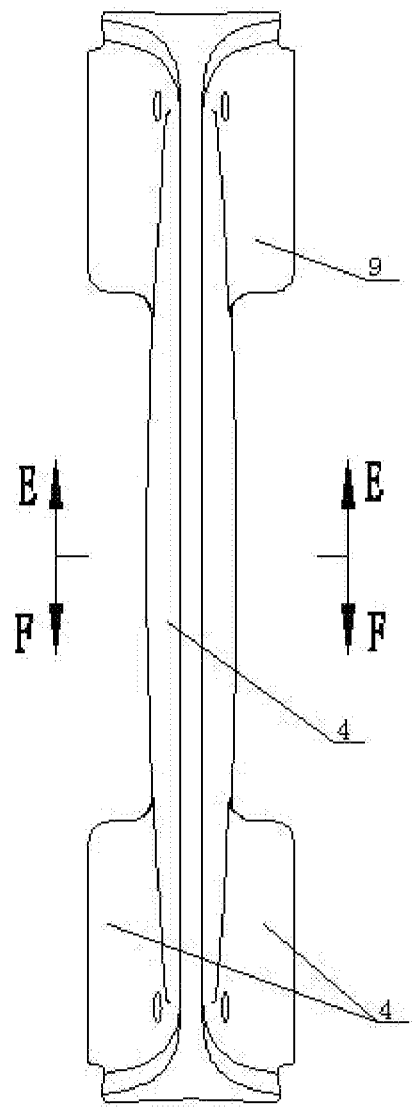
FIG. 8 shows a structural diagram of the valve plate shown in FIG. 6.
Figure 9:
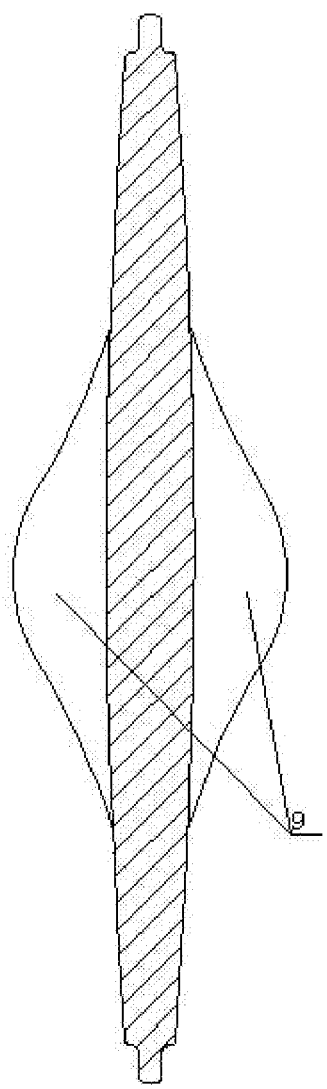
FIG. 9 shows a sectional view along an E-E line in FIG. 8.
Figure 10:
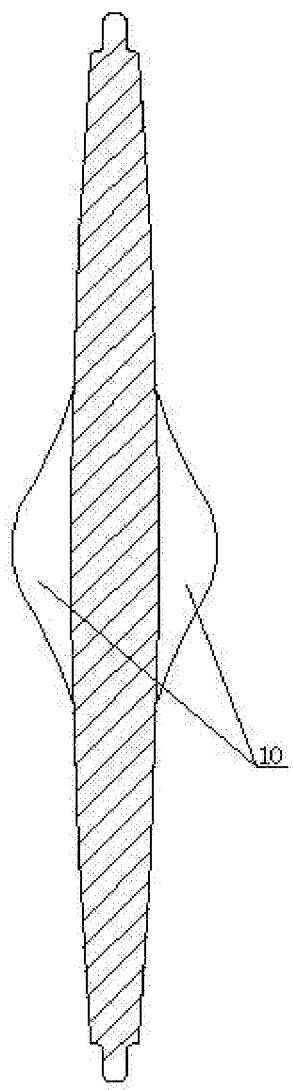
FIG. 10 shows a sectional view along an F-F line in FIG. 8.
Figure 11:
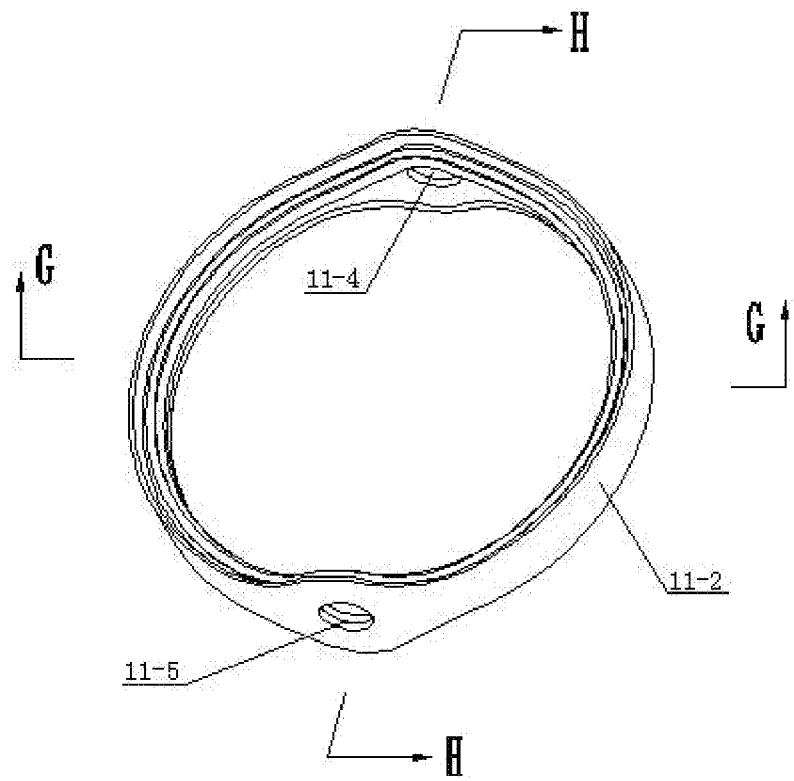
FIG. 11 shows a structural diagram of an elastic sealing ring shown in FIG. 6.
Figure 12:
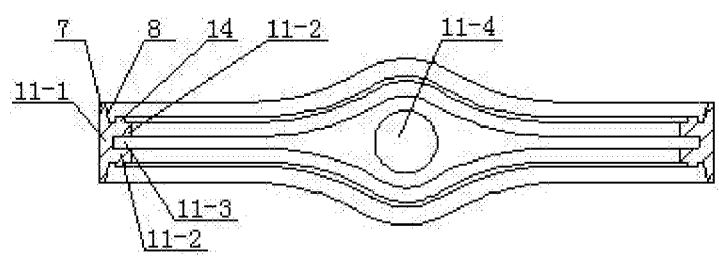
FIG. 12 shows a sectional view along a G-G line in FIG. 11.
Figure 13:
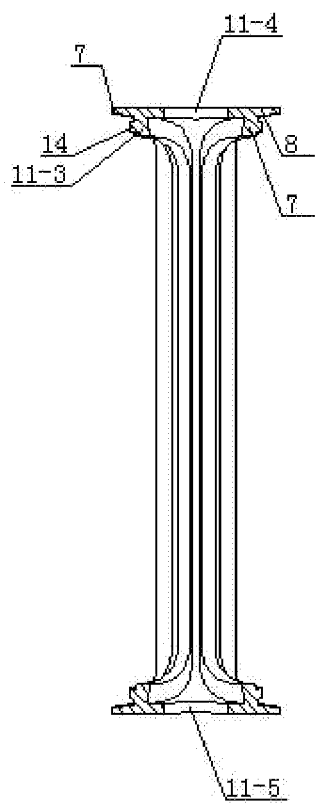
FIG. 13 shows a sectional view along an H-H line in FIG. 11.
Figure 14:
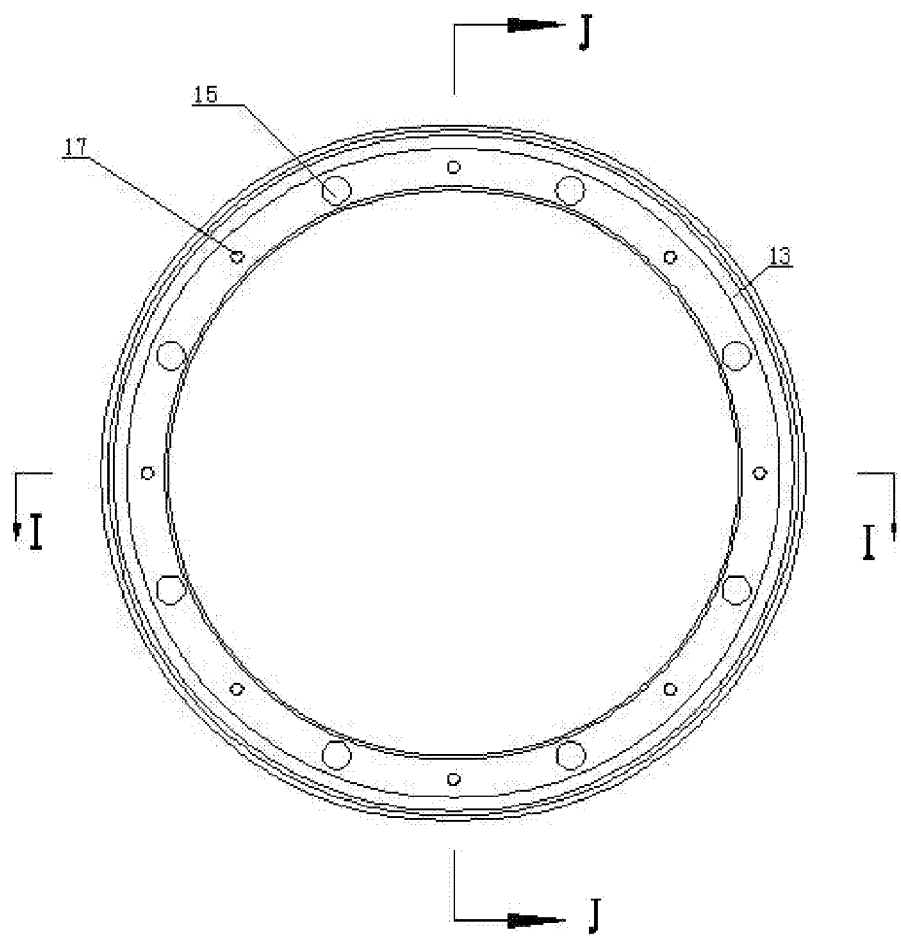
FIG. 14 shows a structural diagram of a stop ring shown in FIG. 6.
Figure 15:
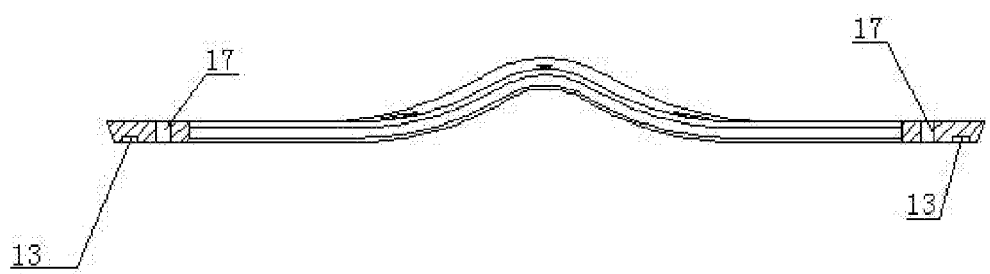
FIG. 15 shows a sectional view along an I-I line in FIG. 14.
Figure 16:
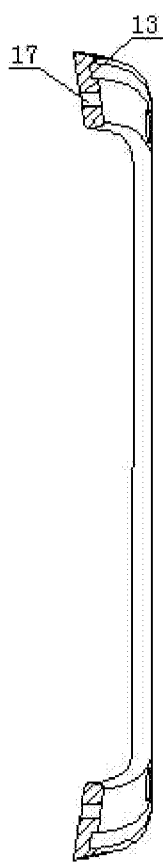
FIG. 16 shows a sectional view along a J-J line in FIG. 14.

With reference to FIGS. 8, 9, and 10, an upper inflated portion 9 for connection with the driving shaft 5 is provided at an upper portion of the valve plate 4, and a lower inflated portion 10 for connection with the supporting shaft 6 is provided at a lower portion of the valve plate 4, a lower surface of the upper inflated portion 9 and an upper surface of the lower inflated portion 10 are oppositely arranged, and an area of the lower surface of the upper inflated portion 9 is greater than an area of the upper surface of the lower inflated portion 10. A pressure difference exists between the pressure imposed by the fluid on the upper inflated portion 9 and on the lower inflated portion 10, the pressure difference may effectively counteract the self-weight of the valve plate, such that the valve plate achieves an effect of floating towards the driving shaft direction, resulting in small opening and closing torques of the valve, which not only makes opening and closing of the valve flexible, but also may reduce wear of the elastic sealing ring.

What is claimed is:

1. A self-sealing butterfly valve, comprising a valve body, wherein a fluid passage is provided in the valve body, a valve plate is provided within the fluid passage, an upper portion of the valve plate is dynamically connected with a driving shaft which is rotatably connected to the valve body, a lower portion of the valve plate is rotatably connected with a supporting shaft which is connected to the valve body, and wherein the valve plate is sleeved with an elastic sealing ring which is capable of enveloping an outer periphery face of the valve plate and outer edges of two end faces of the valve plate, outer edges of two end faces of the elastic sealing ring axially protrude outwardly, forming two ring lips attached to an inner wall of the fluid passage, and the ring lips are gradually thicker in an axial direction from outside to inside relative to the valve plate, so that inner ring faces of the ring lips are inclined faces;

wherein the elastic sealing ring comprises a loop for covering the outer peripheral face of the valve plate, the loop has a driving shaft mounting hole and a supporting shaft mounting hole at two opposite sides, two barriers are provided at intervals on an inner wall face of the loop, the two barriers and the loop form, in concert, a mounting annular groove for sleeving the valve plate, outer side faces of two barriers form the two end faces of the elastic sealing ring, the ring lips are arranged at outer edges of the barriers, and convex ribs are circularly provided on the two end faces of the elastic sealing ring.

2. The self-sealing butterfly valve according to claim 1, wherein an upper inflated portion for connection with the driving shaft is provided at the upper portion of the valve plate, a lower inflated portion for connection with the supporting shaft is provided at the lower portion of the valve plate, a lower surface of the upper inflated portion and an upper surface of the lower inflated portion are oppositely arranged, and an area of the lower surface of the upper inflated portion is greater than an area of the upper surface of the lower inflated portion.

3. The self-sealing butterfly valve according to claim 1, wherein the two end faces of the valve plate are respectively connected with a stop ring, inner end faces of two stop rings are respectively attached with pressure on the two end faces of the elastic sealing ring, outer peripheral faces of two stop rings are all inclined faces which may abut against the inner ring faces, inner end faces of the stop rings are provided with locating annular grooves, and the convex ribs may be inserted into the locating annular grooves.

4. The self-sealing butterfly valve according to claim 3, wherein the stop rings are circularly arranged with a plurality of bolt penetration holes and a plurality of threaded holes, the stop rings are connected to the valve plate by being inserted bolts into the bolt penetration holes, and screws abutting against the valve plate are threaded inside the threaded holes.

5. The self-sealing butterfly valve according to claim 4, wherein the stop ring is a split structure comprising a plurality of unit sheets, wherein each unit sheet is at least provided with two bolt penetration holes and one threaded hole.

6. The self-sealing butterfly valve according to claim 3, wherein a thickness of the stop ring is less than an axial length of the ring lip.

* * * * *